(12) United States Patent
Tannas, Jr.

(10) Patent No.: US 7,708,233 B2
(45) Date of Patent: May 4, 2010

(54) APPARATUS AND METHODS FOR MOUNTING FLAT PANEL DISPLAYS

(76) Inventor: Lawrence E. Tannas, Jr., 1426 Dana Pl., Orange, CA (US) 92866

( * ) Notice: Subject to any disclaimer, the term of this patent is extended or adjusted under 35 U.S.C. 154(b) by 129 days.

(21) Appl. No.: 11/752,273

(22) Filed: May 22, 2007

(65) Prior Publication Data

US 2007/0267554 A1    Nov. 22, 2007

Related U.S. Application Data

(63) Continuation-in-part of application No. 11/049,621, filed on Feb. 2, 2005.

(60) Provisional application No. 60/541,148, filed on Feb. 2, 2004.

(51) Int. Cl.
*G12B 9/00* (2006.01)
(52) U.S. Cl. .................................... 248/27.1; 248/27.3
(58) Field of Classification Search ................ 248/27.1, 248/27.3, 917–923; 361/679.02, 679.28
See application file for complete search history.

(56) References Cited

U.S. PATENT DOCUMENTS

| | | | |
|---|---|---|---|
| 6,163,452 A * | 12/2000 | O'Neal et al. .......... 361/679.27 |
| 6,172,869 B1 | 1/2001 | Hood et al. | |
| 6,204,906 B1 | 3/2001 | Tannas, Jr. | |
| 6,380,999 B1 | 4/2002 | Tannas, Jr. | |
| 6,428,198 B1 | 8/2002 | Saccomanno et al. | |
| 6,559,829 B1 | 5/2003 | Matsuo et al. | |
| 6,612,090 B1 | 9/2003 | Corden | |
| 6,633,276 B1 | 10/2003 | Jaynes | |
| 6,905,101 B1 | 6/2005 | Dittmer | |
| 7,337,566 B2 * | 3/2008 | Inayoshi ...................... 40/593 |
| 7,478,492 B2 | 1/2009 | Madonia | |
| 2003/0103042 A1* | 6/2003 | Moriyasu et al. ............ 345/169 |
| 2007/0047193 A1* | 3/2007 | Smith ......................... 361/683 |
| 2007/0222705 A1* | 9/2007 | Gothard ....................... 345/41 |
| 2009/0159608 A1* | 6/2009 | Shoenfeld ..................... 221/1 |

OTHER PUBLICATIONS

USPTO Office Actions and Communications for Patent Publication No. US/2006/0060732-A1 Jun. 30, 2009, 84 pages.

* cited by examiner

*Primary Examiner*—Amy J Sterling
(74) *Attorney, Agent, or Firm*—William A. English; Vista IP Law Group LLP (57) ABSTRACT

Apparatus and methods are provided for mounting a flat panel display to an outer surface of a control panel over a panel opening therein, e.g., for retrofitting an existing display. A display is secured to a frame, and the frame is mounted to the control panel such that the display is disposed over the panel opening. Wires from the display are directed through the control panel, and coupled to circuitry behind the control panel. For example, a box with circuitry to operate the display may be mounted behind the control panel, e.g., generally opposite the display. The display may be a resized liquid crystal display, e.g., including one or more diagonal corners. The resulting display may be larger than the existing display and/or may maximize the size of an active area of a display given a fixed area available on a control panel.

22 Claims, 7 Drawing Sheets

APPARATUS AND METHODS FOR MOUNTING FLAT PANEL DISPLAYS

RELATED APPLICATION DATA

This application is a continuation-in-part of co-pending application Ser. No. 11/049,621, filed Feb. 2, 2005, which claims benefit of provisional application Ser. No. 60/541,148, filed Feb. 2, 2004, the entire disclosures of which are expressly incorporated by reference herein.

FIELD OF THE INVENTION

The present invention relates generally to electronic displays for displaying information, and to apparatus and methods for mounting a display to a panel, such as a control panel within a cockpit of an aircraft, flight simulator, or work station.

BACKGROUND

Figure 1A:
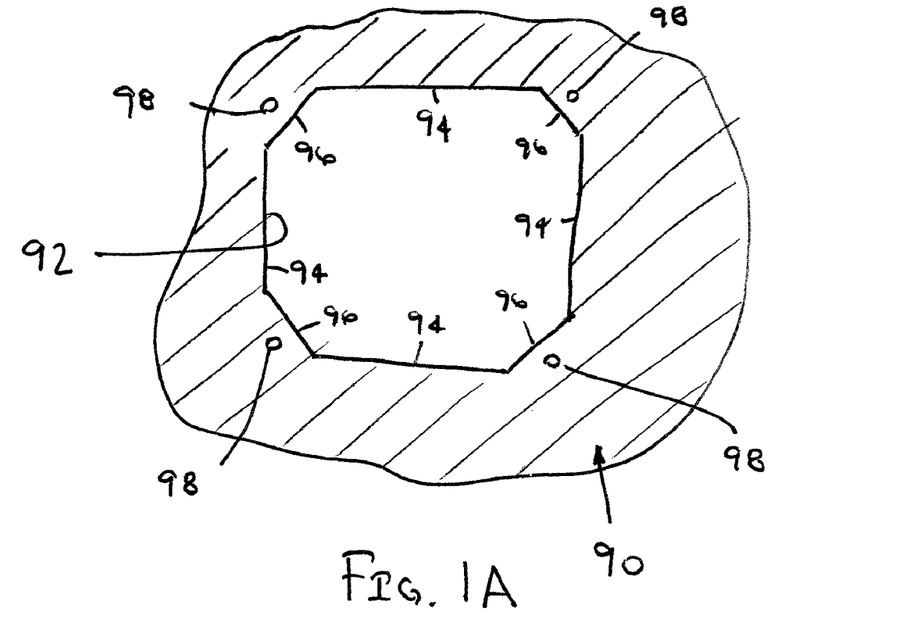
FIG. 1A is a plan view of a panel opening in a control panel.

Control panels, e.g., provided within a cockpit of an aircraft, include a plurality of panel openings for receiving instruments therein. FIG. 1A shows an exemplary panel opening 92 that may be provided in a control panel 90 and having an octagonal shape, e.g., a generally rectangular or square shape defined by vertical and horizontal sides 94 but with diagonal corners 96. Generally, holes 98 are provided adjacent the corners 96 for receiving screws or other fasteners therethrough.

Figure 1B:
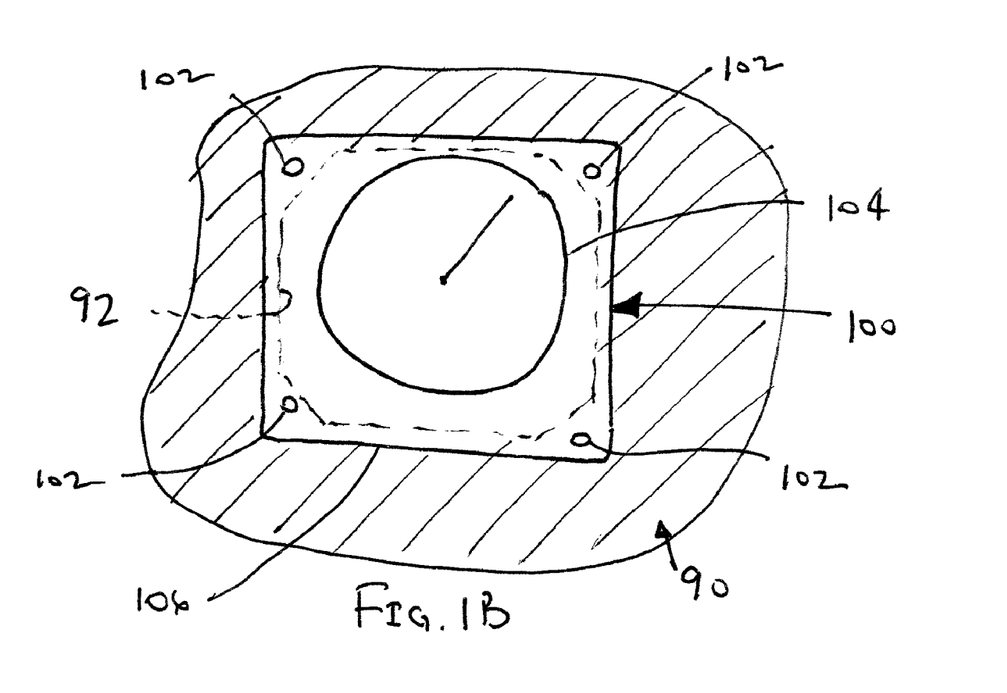
FIG. 1B is a plan view of an instrument received in the panel opening of the control panel of FIG. 1A.

Turning to FIG. 1B, an instrument 100 may be mounted in the panel opening 92, e.g., using screws 102 received through the holes 98 (not shown in FIG. 1B). As shown, the instrument 100 has a round dial 104 and a face plate 106 that abuts the control panel 90 when the instrument 100 is mounted.

Generally, instrument 100 may include a box (not shown) behind the dial 104 that extends through the panel opening 92 into the space behind the control panel 90. The box may include components for operating the instrument 100 and/or for receiving information and/or providing information to other parts of the aircraft. For example, the box may include a cathode ray tube ("CRT") that provides an image to the dial 104, electronic circuits, mechanical components, and the like. Alternatively, the instrument 100 may be mounted through the panel opening 92 from behind the control panel 90. For example, the dial 104 may be sufficiently small to extend through the opening 92, with the box and other portions of the instrument 100 secured to the back of the panel 90 or otherwise behind the panel 90.

More recently, flat panel displays ("FPDs") have been suggested to replace older instruments, such as CRTs or mechanical gauges. FPDs, however, may not be made economically with the four corners removed or rounded, e.g., due to the external circuits extending along at least two edges of the displays. Consequently, if a square or rectangular display is to be mounted within a panel opening, the display must be smaller than the panel opening, which may substantially reduce the active image area of the display available for displaying information.

Further, a box is generally required for carrying the electronics for operating a FPD or other display. The box may be mounted behind the control panel before the PFD is mounted over the panel opening. Once the box is mounted, however, it may be difficult to make any necessary connections between the box and the FPD and/or to secure the FPD to the control panel.

Accordingly, apparatus and methods for mounting a display to a control panel would be useful.

SUMMARY OF THE INVENTION

The present invention is directed generally to electronic displays, e.g., display heads including flat panel displays ("FPDs"), such as liquid crystal displays ("LCDs"), and more particularly to apparatus and methods for retrofitting or otherwise mounting a display to a control panel, such as a cockpit panel within an aircraft or other vehicle, a flight simulator, or a work station.

In accordance with one embodiment, a method is provided for mounting a display, such as an LCD or other FPD, to a control panel that includes mounting a display to an outer surface of the control panel, e.g., over a panel opening in the control panel, directing one or more wires from the display through the control panel, and coupling the one or more wires to circuitry behind the control panel. In one embodiment, the display may be mounted to a frame, and the frame may be secured to the control panel by directing fasteners through respective holes in the frame and holes in the control panel used to secure the existing display. In addition or alternatively, a box may be mounted behind the control panel, e.g., generally opposite the display. The box may include circuitry that may be coupled to the display, e.g., for operating the display.

In accordance with another embodiment, a method is provided for mounting a flat panel display to a control panel having a panel opening therein, the panel opening having an opening width and an opening height. The display may be secured to a frame, and the frame may be mounted to an outer surface of the control panel such that the display is disposed over the panel opening. In one embodiment, the display may have a display width and a display height, and at least one of the opening width and the opening height may be smaller than the display width and the display height. For example, an active area of the display that displays information may be greater than the open area of the panel opening.

In an exemplary embodiment, an existing display may be removed from the panel opening before mounting the frame to the outer surface of the control panel. The new display may have an active area that is greater than the existing display, e.g., thereby increasing and/or maximizing the size of the display given the fixed area available on the control panel.

In accordance with yet another embodiment, a method is provided for retrofitting an existing display mounted to a control panel, at least a portion of the existing display extending into a panel opening in the control panel. The method may include removing the existing display from the control panel, securing the display to a frame, mounting the frame to an outer surface of the control panel such that the display is disposed over the panel opening, directing one or more wires from the display through the control panel, and coupling the one or more wires to circuitry behind the control panel, e.g., for operating the display.

In accordance with still another embodiment, a flat panel display is provided that is mountable to a control panel including a panel opening therein. The panel opening may include a rectangular shape including diagonal corners, the diagonal corners having holes therein for receiving fasteners. The flat panel display may include a bezel including a generally planar, rectangular frame having a rectangular opening therein, and a liquid crystal display. Optionally, the bezel may include a plurality of holes in corners of the frame for receiving respective fasteners therethrough and a recess including one or more diagonal walls adjacent the holes. The liquid crystal display may be secured to the bezel such that an active area of the display that displays information is exposed through the rectangular opening. The display may include a rectangular shape, e.g., a square shape, having at least one diagonal corner to accommodate the display being received in the recess of the bezel.

In one embodiment, the frame may include a front panel having the rectangular opening therein, and a rear panel, and the display may be secured to the bezel between the front and rear panels. Optionally, at least one backlight may be disposed within the bezel, e.g., between the rear panel and the display. The rear panel may be substantially flat such that the bezel is mountable to an outer surface of a control panel over a panel opening therein without a portion of the bezel extending into the panel opening.

Optionally, a box or other package may also be provided that is mountable behind a control panel generally opposite the bezel. The box may include one or more circuits for operating the display. The display may include one or more wires or other leads extending therefrom for extension through the control panel to the box for coupling the display to the one or more circuits.

In accordance with yet another embodiment, an apparatus is provided for mounting a display to a control panel having an opening therein. Generally, the apparatus includes a bracket including one or more fastener elements for mounting the bracket to the control panel over the opening. In exemplary embodiments, the fastener elements may include fasteners extending from the bracket, holes for receiving fasteners, clips, and the like. The fastener elements may be provided at predetermined locations on the bracket, e.g., such that the fastener elements may be aligned with the existing holes in the control panel adjacent the panel opening.

The apparatus may also include a bezel or frame for securing the display to the bracket such that the display at least partially covers the panel opening. For example, the display may have dimensions larger than the panel opening such that the display covers both the panel opening and any fasteners or holes adjacent the panel opening. In an exemplary embodiment, the bezel and bracket are pivotally attached to one another, e.g., along one edge of the bezel and bracket. Optionally, the bezel and/or bracket may include interlocking elements, a latch, or other lock for securing the bezel against the bracket, e.g., such that the bezel and bracket lie substantially parallel to one another and/or to the control panel. Thus, the apparatus may minimize a profile of the display, e.g., how far the display protrudes from the surface of the control panel, while maximizing the available image area of the display given the limited size of an existing panel opening in a control panel.

Optionally, the apparatus may also include a box mountable to the control panel behind the panel opening, which may include electrical circuits for operating the display, one or more ribbon connectors or other cables for coupling the electrical circuits to the display, switches, and the like. In addition or alternatively, the apparatus may include a backlight for delivering light to a back surface of the display, e.g., mounted directly to the display or provided in the box.

In accordance with another embodiment, a method is provided for mounting a display to a control panel having a panel opening therein. A bracket may be mounted to the control panel over the panel opening, e.g., using one or more fasteners received in one or more corresponding holes in the control panel adjacent the panel opening. A display, e.g., an FPD, may be secured to the bracket, the display having a size larger than the panel opening. Thus, the display may at least partially cover the panel opening and/or the one or more fasteners used to mount the bracket to the control panel.

In one embodiment, the display may be received within or against a bezel. Optionally, the bezel may be pivotally mounted to the bracket, e.g., before or after placing the display in the bezel. For example, the bezel may be pivotally and/or removably attached to the bracket by a hinge along one edge. The bezel may be pivoted away from the control panel, thereby providing access through an opening in the bracket into the space behind the control panel. Optionally, a box, e.g., including electronics for operating the display, may be mounted to the back of the control panel behind the panel opening, which may be accessed through the bracket opening and panel opening.

The display may be inserted in or otherwise secured to the bezel, and any cables, e.g., ribbon connectors, and the like, may be connected between the box and the display. Optionally, any switches, shafts for control knobs, and the like may also be connected to the display. The bezel may be closed over the panel opening, and locked relative to the bracket, thereby securing the display substantially against or adjacent the control panel.

In yet another embodiment, a method is provided for retrofitting an existing display mounted to a control panel over a panel opening. The existing display may be removed from the panel, and a bracket may be mounted to the control panel at least partially over the panel opening. A flat panel display may be secured to the bracket such that the display at least partially overlies the panel opening, the flat panel display having a size larger than the panel opening.

In still another embodiment, a method is provided for mounting a flat panel display to a control panel having one or more holes therein. A bracket is mounted to the control panel using the one or more holes, the display is electrically coupled to display electronics through the one or more holes, and the display is secured to the bracket such that the display overlies the one or more holes.

Other aspects and features of the present invention will become apparent from consideration of the following description taken in conjunction with the accompanying drawings.

BRIEF DESCRIPTION OF THE DRAWINGS

The drawings illustrate exemplary embodiments of the invention, in which.

DETAILED DESCRIPTION OF THE EXEMPLARY EMBODIMENTS

Figures 2, 2A:
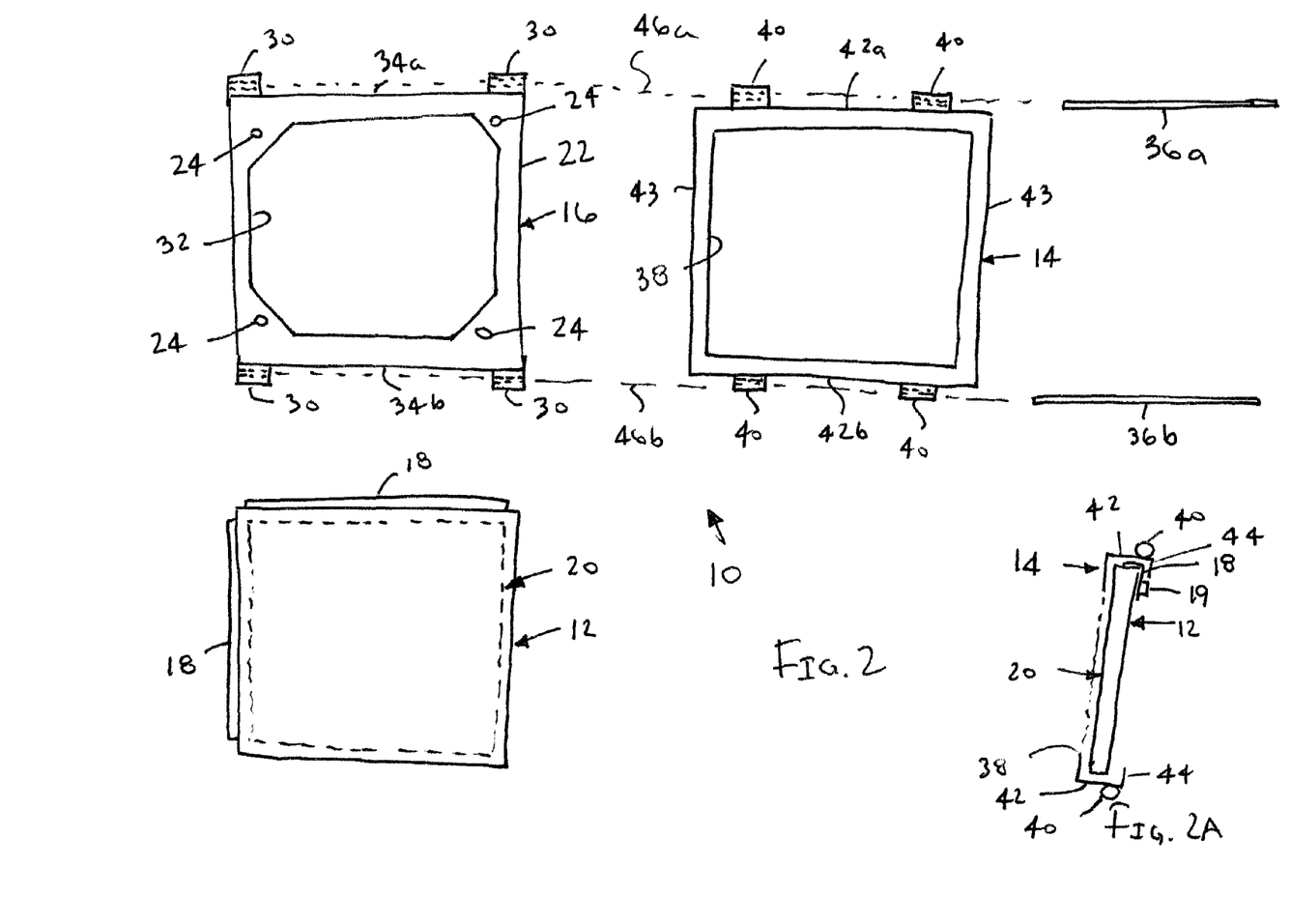
FIG. 2 is an exploded perspective view of an exemplary electronic display apparatus, including a flat panel display, a bezel for receiving the display, and a bracket for mounting the bezel and/or display to a control panel.
FIG. 2A is a side view of the bezel of FIG. 2 with the display received therein.

Turning to the drawings, FIG. 2 shows an exemplary embodiment of an apparatus 10 that generally includes a flat panel display ("FPD") 12, a bezel or other frame 14 for receiving the display 12, and a bracket 16 for mounting the bezel 14 and/or display 12 to a control panel, such as the control panel 90 shown in FIG. 1A.

The display 12 may be a liquid crystal display ("LCD"), such as an active matrix liquid crystal display ("AMLCD"). It will be appreciated that the display 12 may include other types of electronic displays, such as plasma displays, liquid crystal on silicon ("LCOS") displays, and the like. The display 12 may have a rectangular, square, or other size and/or shape, which may be larger than a cross-section of the panel opening 92 in the control panel 90, as explained further below. Optionally, the display 12 may be a resized display, i.e., a rectangular display that has been cut and resealed into a smaller configuration, e.g., a square or other configuration. Exemplary displays that may be used and methods for making them are disclosed in U.S. Pat. No. 6,204,906, in co-pending application Ser. No. 11/135,785, filed May 23, 2005, and international application WO 2006/028445, published Mar. 16, 2006. The entire disclosures of these references and any others cited therein are expressly incorporated by reference herein.

The display 12 may include one or more external circuits 18, e.g., TABs, COGs, driver circuits, and the like, extending along one or more edges of the display 12. In an exemplary embodiment, the circuits 18 may extend from a top edge and a side edge of the display 12 around onto a back surface of the display 12, similar to FPDs used for laptop computers and other devices where it is desirable to minimize components extending outwardly from the top and/or side edges of the display 12. One or both circuits 18 may include a connector 19 (see FIG. 2A), which may be used to couple the circuits 18 to other electrical circuits (not shown) for operating the display 12. Optionally, the display 12 may include other components, such as one or more polarizer films, filters, image enhancement films, and/or viewing angle enhancement films on front and/or back surfaces of the display 12, e.g., overlying an active image area 20 of the display 12.

With continued reference to FIGS. 1A and 2, the bracket 16 generally includes a planar member 22 including a plurality of fastener elements 24 for mounting the bracket 16 to the control panel 90, and a plurality of interlocking elements 30 for attaching or otherwise securing the bezel 14 relative to the bracket 16. Optionally, the bracket 16 may include one or more openings therethrough, such as bracket opening 32. The bracket opening 32 may correspond in size and/or shape to the panel opening 92 or may be smaller or larger than the panel opening 92, e.g., to accommodate connecting components to the display 12. The planar member 22 may have a rectangular or square periphery, as shown, although alternatively, the planar member 22 may have an elliptical or round shape, if desired based upon the available space on the control panel 90.

As shown in FIG. 2, the fastener elements 24 are holes for receiving fasteners therethrough, e.g., screws, rivets, bolts, pins, and the like (not shown). Alternatively, the fastener elements 24 may include fasteners, e.g., screws, bolts, clips, threaded rods, and the like, extending from the planar member 22 (not shown). In this alternative, the fasteners may be welded, bonded, or otherwise substantially permanently attached to the planar member 22, e.g., such that the fasteners extend substantially perpendicularly from a back surface of the planar member. Alternatively, the fasteners may be inserted through holes provided in the planar member 22 and attached thereto. In a further alternative, other fastener elements (not shown) may be used for mounting the bracket 16 to the control panel 90.

The fastener elements 24 may be distributed about a periphery of the planar member 22 in a desired pattern, e.g., corresponding to the existing pattern of holes 98 adjacent the panel opening 92 in the control panel 90 to which the bracket 16 is to be mounted. Although four fastener elements 24 are shown, it will be appreciated that fewer or additional fastener elements 24 may be provided, e.g., two, three, or more on the bracket 16, if desired or the existing control panel dictates.

As shown in FIG. 2, the interlocking elements 30 may include a plurality of sockets for receiving pins 36 therein. In one embodiment, the interlocking elements 30 may be formed by providing one or more tabs or other extensions from one or more edges 34 of the planar member 22 that are rolled to at least partially define a channel. Alternatively, the interlocking elements 30 may be separate tubular sections attached along the edges 34 of the bracket 16, e.g., by welding, bonding with an adhesive, using connectors, and the like. The interlocking elements 30 may define a substantially cylindrical channel, or other channel shape corresponding to a cross-section of the pins 36.

The bracket 16 may be formed from a flat sheet of material, e.g., a relatively thin sheet of metal, such as aluminum or stainless steel, a plastic, or a composite material. The flat sheet may be cut into the shape of the planar member 22 with extensions to accommodate interlocking elements 30 along opposite edges 34. The bracket opening 32, holes 24, and/or other openings (not shown) may be cut or otherwise formed in the planar member 22, and the extensions may be formed, e.g., by roll-forming, breaking, or otherwise transforming the extensions into the interlocking elements 30. Alternatively, all or a portion of the bracket 16 may be machined, cast, injection molded, and the like.

If the interlocking elements 30 are provided from separate tubular sections, the tubular sections may be cut or otherwise formed from a long section of tubing cut into individual tubular sections, and attached to the planar member 22. The interlocking elements 30 may be substantially flush relative to a back surface of the bracket 16, e.g., such that the bracket 16 may be placed directly against a control panel or other surface without the interlocking elements 30 interfering. Thus, the interlocking elements 30 may protrude slightly from a front surface of the bracket 16 or alternatively may be substantially flush with the front surface of the bracket 16.

With continued reference to FIG. 2 and additional reference to FIG. 2A, the bezel 14 may also be a generally planar member including a frame or border generally defining a rectangular or square shape. The bezel 14 may include an opening 38 therein, e.g., to allow an active imaging area 20 of the display 12 to be seen therethrough, as explained further below. The bezel 14 may include one or more interlocking elements 40 extending along edges 42 of the bezel 14, which may be formed similar to the interlocking elements 30 on the bracket 16. Optionally, the bezel 14 may include one or more switches, dials, or other components (not shown) useful for operating the display 12 received therein.

The bezel 14 may also include one or more side portions, e.g., defining a groove or pocket for receiving the display 12 therein. For example, as shown in FIG. 2A, the bezel 14 may include flanges 44 extending along opposite upper and lower edges 42 of the bezel 14, thereby defining grooves into which the display 12 may be slid from one end of the bezel 14. Optionally, the bezel 14 may include flanges (not shown) on one or both side edges 43, which may limit insertion of the display 12. For example, a transverse flange may be provided on one end, and a planar flange may be provided on the other end that may be directed from a planar to a transverse orientation after the display 12 is inserted between the flanges 44, e.g., to secure the display 12 to the bezel 14. Alternatively, the bezel 14 may include clips, fasteners, or other elements (not shown) for securing the display 12 to the bezel 14, e.g., such that the active image area 20 of the display 12 is visible through the opening 38.

Similar to the bracket 16, the bezel 14 may be formed from metal, plastic, or composite materials, e.g., that may be broken or otherwise formed from a flat sheet, cast, injection molded, and the like. As shown in FIG. 2, the bezel 14 may have an outer perimeter similar in size to the bracket 16. Alternatively, the bezel 14 may be larger than the bracket 16, yet may be secured relative to the bracket 16, e.g., by the interlocking elements 30, 40. Optionally, the bezel 14 (or other components of the apparatus 10) may include one or more environmental seals and/or shielding for protecting the display 14 or otherwise ruggedizing the display 12.

The bezel 14 may be secured to the bracket 16, e.g., using one or more pins 36. The bezel 14 may be placed over the bracket 16 such that the interlocking elements 40, 30 along corresponding edges 42a, 34a are aligned with one another, as exemplified by the dashed line 46a in FIG. 2. The interlocking elements 40 on the bezel 14 may be offset along the edges 42 as compared to the interlocking elements 30 on the bracket 16 such that the interlocking elements 30, 40 may be disposed adjacent one another when the bezel 14 is properly aligned with the bracket 16.

The pin(s) 36a may then be inserted through the interlocking elements 30, 40, thereby securing the bezel 14 to the bracket 16. With only one pin 36a inserted through the interlocking elements 30, 40, the bezel 14 may be pivotally secured to the bracket 16 along edges 42a, 34a. Thus, the bezel 14 may be pivotally movable between a closed position (such as that shown in FIG. 4), wherein the bezel 14 overlies the bracket 16, and an open position (such as that shown in FIG. 3), wherein the bezel 14 is disposed away from the bracket 16, exposing the bracket opening 32. In alternative embodiments, alternative hinge structures may be provided to pivotally secure the bezel 14 relative to the bracket 16.

With the bezel 14 moved into the closed position, the bezel 14 may substantially cover the bracket opening 32 and the fastener elements 24 (or fasteners, not shown, received through the fastener elements 24). In this position, the interlocking elements 40, 30 on the opposite side edges 42b, 34b may be aligned with one another, as exemplified by dashed line 46b. Pin(s) 36b may then be inserted through the interlocking elements 30, 40, thereby preventing the bezel 14 from subsequently moving relative to the bracket 16. If the display 12 is received in or otherwise secured to the bezel 14, the display 12 may consequently be secured relative to the bracket 16 when the bezel 14 is secured to the bracket 16.

Optionally, to avoid the bezel 14 from subsequently separating from the bracket 16, the pins 36 may be secured relative to the interlocking elements 30, 40. For example, one or more of the interlocking elements 30, 40 may be crimped down on each pin 36, thereby preventing the pins 36 from being unintentionally removed. Alternatively, one or more ends of the pins 36 may be bent to prevent their subsequent removal, or set screws (not shown) may be provided that may be tightened down on the pins 36 to prevent their removal.

In addition or alternatively, the pins 36 may be attached to one or more of the interlocking elements 30, 40, e.g., using an adhesive, by welding, and the like. Alternatively, one of the interlocking elements 30, 40 may include a pin (rather than a socket), and the adjacent interlocking elements 40, 30 may include a socket for receiving the pin. In a further alternative, instead of interlocking elements 30, 40 along side edges 34b, 42b and pin 36b, a latch, screws, or other locking mechanism (not shown) may be provided to secure the bezel 14 pivotally and/or fixedly to the bracket 16.

Figure 3:
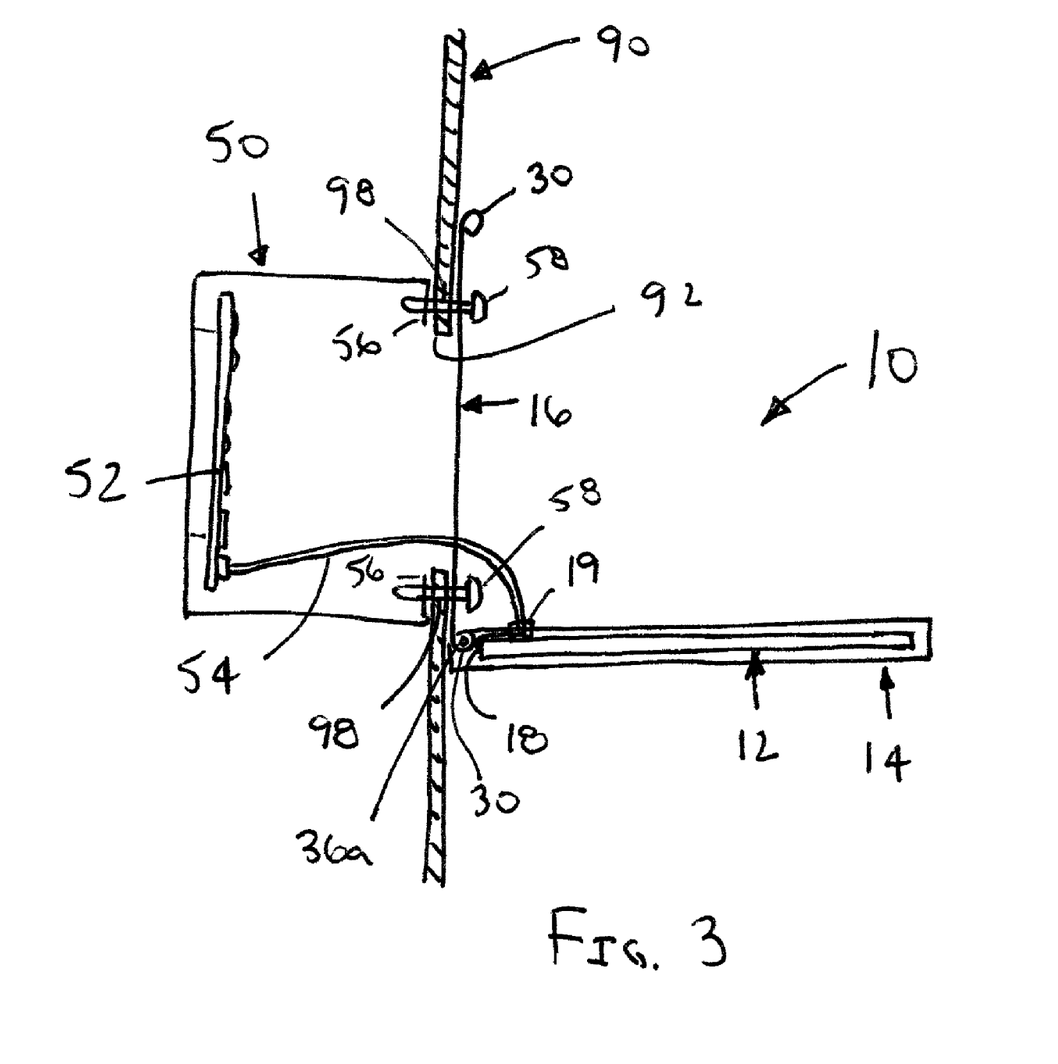
FIGS. 3 and 4 are cross-sectional side views of a control panel, showing a method for mounting a flat panel display to the control panel over a panel opening therein.

Turning to FIG. 3, optionally, the apparatus 10 may also include a casing or box 50, which may include electrical circuits 52 for operating the display 12. One or more cables 54 may be provided for coupling the electrical circuits 52 to the display 12, e.g., via connector 19. The box 50 may include any package for carrying and/or enclosing the electrical circuits 52, as is well known in the art. Optionally, the box 50 may include one or more flanges 56 for mounting the box 50 to the control panel 90, e.g., to the back of the control panel 90 behind the panel opening 92. In one embodiment, the flanges 56 may include holes (not shown) for receiving fasteners 58 therethrough. The fasteners 58 may also be used for mounting the bracket 16 to the control panel 90 or separate fasteners (not shown) may be used. Alternatively, the box 50 may be inserted through the panel opening 92 from the front of the control panel 90. In this alternative, the box 50 may include outward oriented flanges or other elements (not shown) that may prevent the box 50 from passing entirely through the panel opening 92.

In addition or alternatively, a clamp apparatus (not shown) may be used for mounting the box 50 to the control panel 90. The clamp apparatus may include one or clamp members that may be received around the box 50 adjacent the control panel 90. The clamp members may include lips or other elements for securing the clamp to the back of the control panel 90, e.g., using one or more fasteners (also not shown).

In yet another option, the apparatus 10 may include a backlight (not shown) for delivering light through the display 12. In one embodiment, the backlight may be mounted directly to the back of the display 12. In this embodiment, the bezel 14 and/or bracket 16 may be configured to accommodate the backlight, which may extend inwardly partially through the panel opening 92 from the display 12. In an alternative embodiment, the backlight may be provided in the box 50, e.g., adjacent the control panel 90, and the backlight may be optically coupled to the display 12, e.g., by one or more lenses and the like (also not shown). For example, the backlight may include a parabolic member for directing light from a point source towards the backplane of the display 12. Alternatively, a flat backlight may be mounted to the box that is disposed substantially parallel to the display 12 for delivering light to the backplane of the display 12.

Figure 4:
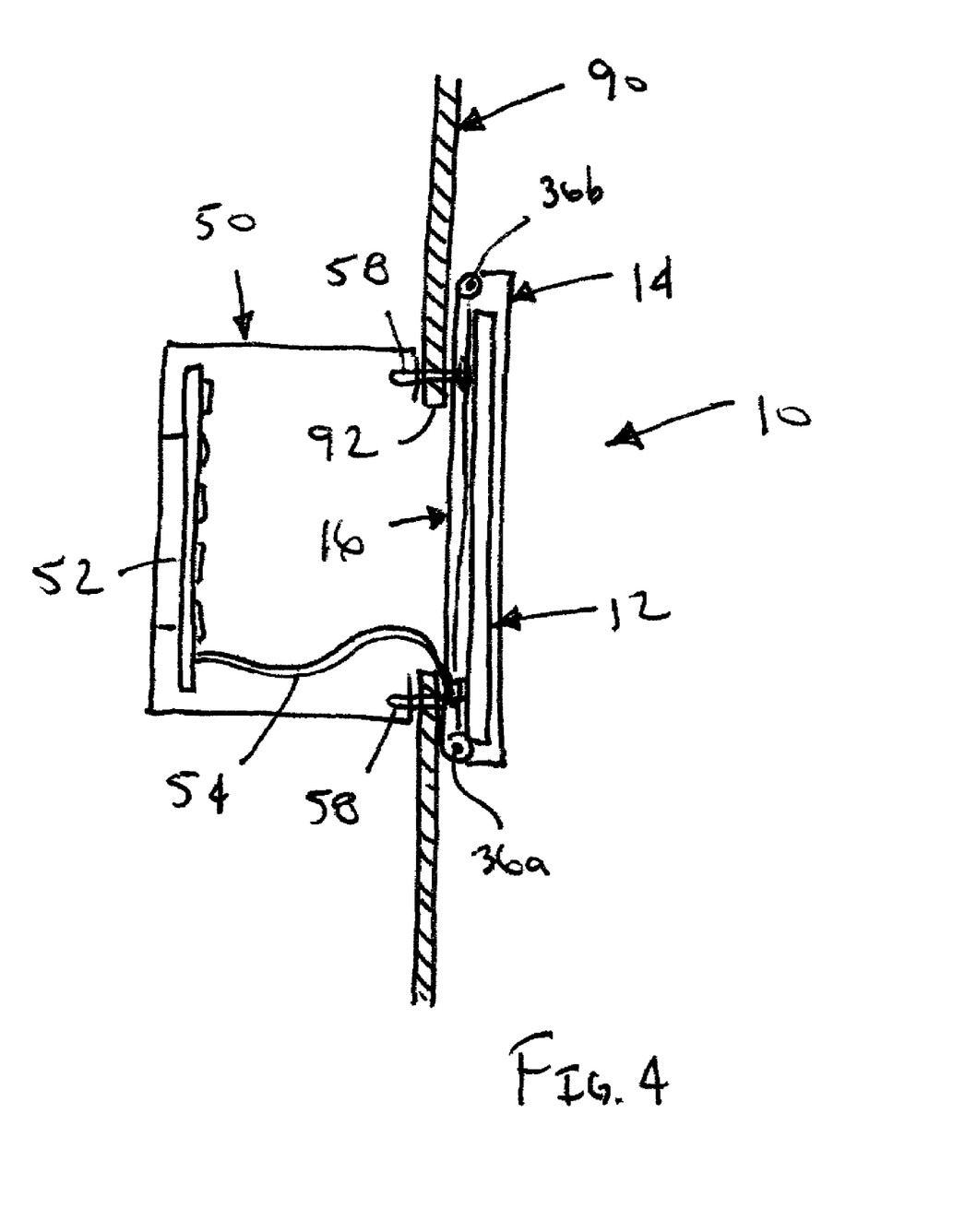

Turning to FIGS. 3 and 4, a method is shown for mounting a flat panel display 12 to a control panel 90, e.g., using any of the apparatus 10 described herein. The control panel 90 may be located within a cockpit of an aircraft, or on the dashboard of another vehicle. Alternatively, the control panel 90 may be part of a flight simulator or a work station (not shown).

The apparatus 10 may be used to retrofit or replace an existing display (not shown) with the display 12. For example, as shown in FIG. 1B, an instrument 100 may already be mounted to the control panel 90 through the panel opening 92. The instrument 100 may include a CRT or gauge that has discontinued to function or is simply being upgraded to an LCD or other FPD. The instrument 100 may be removed from the control panel 90, e.g., by removing fasteners 102 and then pulling the instrument 100 out of the panel opening 92 and away from the control panel 90. For example, an existing instrument may include a display that is inserted into the panel opening 92 from behind the control panel 90, and the existing instrument may have to be pulled back out of the panel opening 92 from behind, e.g., because the box or other components of the existing instrument are to large to be pushed out of the panel opening 92. Pulling the instrument 100 may also require disconnecting or severing cables or mechanical connectors (not shown) that are coupled to the instrument 100.

Turning to FIG. 3, box 50 may be placed behind the panel opening 92 and/or secured to the control panel 90. For example, the box 50 may be inserted at least partially through the panel opening 92 and may be secured to the control panel 90 by one or more fasteners, a clamp apparatus, and the like.

The bracket 16 may be mounted to the control panel 90 adjacent and/or over the panel opening 92. For example, fasteners 58 may be directed through holes 24, 98 in the bracket 16 and control panel 90 to substantially secure the bracket 16 against the control panel 90. The same fasteners 58 may be used to mount the box 50 or separate fasteners may be used.

The display 12 may then be secured to the bracket 16, e.g. such that the display 12 overlies the panel opening 92. For example, as shown in FIG. 3, the bezel 14 may be pivotally secured to bracket 16 by a pin 36a, which may be received through interlocking elements 30, 40 (not shown, see FIG. 2), as described previously. Optionally, the pin 36a may be secured to one or more of the interlocking elements 30, 40, e.g., by clamping down on the interlocking element(s) 30, 40, thereby creating an interference fit that prevents the pin 36a from being removed subsequently.

With the bezel 14 pivotally secured to the bracket 16, the bezel 14 may be moved to the open position shown in FIG. 3, and the display 12 may be secured to the bezel 14. For example, as described previously, the display 12 may be slid between flanges 44 on the back of the bezel 14, as shown in FIG. 2A. Although the bezel 14 is shown pivoting horizontally, it will be appreciated that the interlocking elements 30, 40 or other hinge structure may be provided on the top or bottom edges of the bezel 14 and bracket 16, if desired.

One or more cables, e.g., ribbon connector 54, may be connected between the box 50 and the display 12 to couple the electrical circuits 52 in the box 50 to the circuits 18 on the display 12. The cable(s) may be directed through the bracket opening 32 in the bracket 16 (not shown, see FIG. 2).

If a backlight is provided within the box 50 or on the back of the display 12, the backlight may be coupled to the display 12, if necessary. In addition or alternatively, if the display 12 requires one or more switches, dials, or other mechanical connections, e.g., provided on the bezel 14 or the display 12, the connection(s) may be coupled through the panel opening 92, e.g., to the box 50 or other component(s) behind the control panel 90.

With the display 12 connected to any necessary components through the bracket opening 32, the bezel 14 may be directed to the closed position, as shown in FIG. 4. Pin 36b may be inserted through the interlocking elements 30, 40, thereby securing the bezel 14, and consequently, the display 12 relative to the control panel 90.

As shown, the display 12, bezel 14, and bracket 16 may all lie substantially flat, e.g., substantially parallel to the control panel 90 when the display 12 and bezel 14 are secured to the bracket 16. In an exemplary embodiment, the display 12 and bezel 14 may project a relatively small distance above the surface of the control panel 90 in the final installation. With the display 14 being a FPD, the profile of the installation may be substantially minimized. For example, the display 12 may extend not more than about thirty millimeters (30 mm) or even less than about ten millimeters (10 mm) above the control panel 90 when the display 12 is secured to the control panel 90.

As shown in FIG. 4, the display 12 may cover the fasteners 58 used to mount the bracket 16 to the control panel 90. Thus, the display 12 may substantially cover the bracket 16, e.g., particularly the bracket opening 32. Consequently, the display 12 may also substantially cover the panel opening 92 behind the bracket 16. Because of this configuration, the size of the display 12 is not limited by the size of the panel opening 92 as was the old instrument 100 received through the panel opening 92.

Thus, a display 12 that has a size larger than the maximum cross-sectional dimension of the panel opening 92 may be secured to the control panel 90, thereby maximizing the active image area that may be used to provide information. The size of the display 12 may consequently be dictated, not by the size of the panel opening 92, but by the proximity of the display 12 to other displays or instruments mounted to the control panel 90 near the panel opening 92. For example, if the panel opening 92 had a width and height of two inches (50 mm) by two inches (50 mm), it may be possible to mount a display 12 having a width of three inches (75 mm) by three inches (75 mm) over the panel opening 92, thereby allowing the size of the display 12 to be increased beyond the limitations of the size of the panel opening 92.

Another advantage of the apparatus 10 described herein is that it may reduce the cost to repair or replace the display 10 after installation. For example, with prepackaged instruments, if the instrument fails, the entire instrument is generally replaced. With the apparatus 10, it may only be necessary to repair or replace one or more components of the apparatus 10 after installation. For example, if the display 12 fails to operate after installation, the display 12 and/or box 50 may be tested. If only one of the display 12 and box 50 need repair or replacement, the other components may remain in place.

To access the box 50 or remove the display 60, one of the pins 36 may be removed, the bezel 14 opened, and any cables 46 disconnected through the panel opening 92. If the display 12 needs to be replaced, the box 50, bezel, and bracket 16 may remain. The old display 12 may simply be removed from the bezel 14, and a new display 12 inserted back into the bezel 14, which may then be closed and secured to the bracket 16 by pin 36 (which may be the same pin or a new pin). If the box 50 needs repair or replacement, it may be possible to leave the display 12, bezel 14, and bracket 16 in place while the box 50 is repaired or replaced.

Further, the interchangeability of the apparatus 10 may allow different size displays 12 and bezels 14 to be secured to a single bracket 16 and/or coupled to a single box 50. Thus, the apparatus 10 may improve the overall versatility of the display 12 or other different size or configuration displays (not shown). Further different boxes may be provided that drive or otherwise operate an individual display 12 to display different information, e.g., to provide an altimeter, an airspeed indicator, a horizontal situation display, engine instrument, and the like based upon the inputs provided by the selected box.

Figures 5, 5A, 5B, 5C:
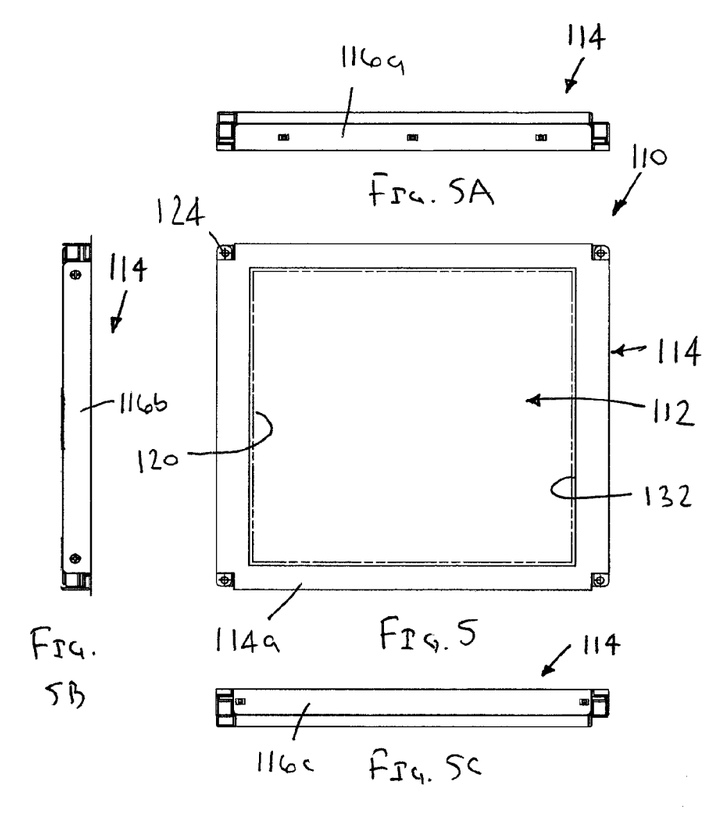
FIG. 5 is a front view of another embodiment of a flat panel display including a liquid crystal display and a bezel or frame for mounting the display to a control panel.
FIGS. 5A-5E are top, left side, bottom, right side, and rear views, respectively, of the flat panel display of FIG. 5.
Figure 5D:
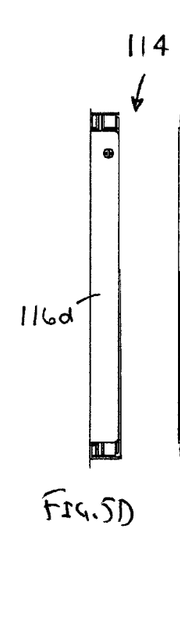
Figure 5E:
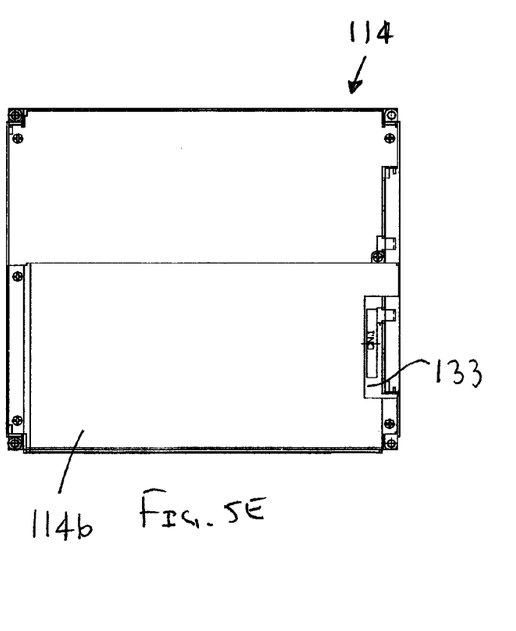
Figure 7:
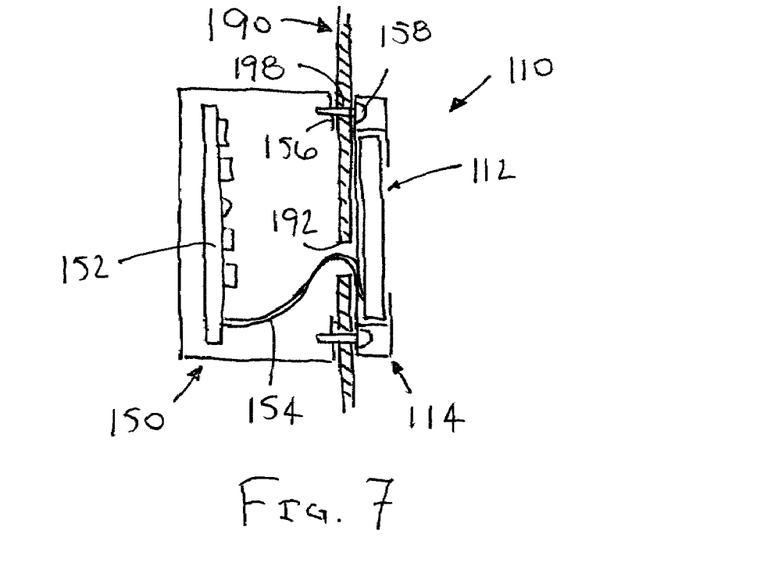
FIG. 7 is a cross-sectional side view of a control panel, showing a flat panel display mounted over a panel opening in the control panel and coupled to circuitry within a box mounted behind the control panel.

Turning to FIGS. 5-5E, another embodiment of a flat panel display 110 is shown that includes a liquid crystal display 112 and a bezel or frame 114 for mounting the display 112 to an outer surface of a control panel (not shown, see, e.g., control panels 90, 190 shown in FIGS. 3 and 7).

The display 112 may be an LCD, or other type of electronic display, such as a plasma display, LCOS display, and the like, similar to other embodiments described elsewhere herein. The display 112 may have a substantially rectangular, square (a square being a specific example of a rectangle), or other size and/or shape. Optionally, the display 112 may be a resized display, i.e., a rectangular display that has been cut and resealed into a smaller configuration, e.g., a substantially square or other configuration.

As best seen in FIG. 5, the display 112 includes an active image area 120, which is capable of displaying information, e.g., when electrical signals are delivered to the internal electrical circuits of the display 112. In an exemplary embodiment, the active image area 120 may be substantially square, e.g., by removing and resealing an edge of a display originally including a rectangular image area (not shown). The display 112 may include one or more inactive areas, e.g., between the active image area 120 and outer edges (not shown) of the display 112, which may be incapable of displaying information. The inactive area may be an area that has never been active, e.g., does not include internal electronics for generating images, and/or may include one or more areas of a resized display that have been deactivated during the resizing process.

The display 112 may also include one or more external circuits (not shown) extending along one or more edges of the display 112. In an exemplary embodiment, external circuits may extend from a top edge and a side edge of the display 112 around onto a back surface of the display 12, similar to other embodiments described herein. One or both external circuits may include one or more connectors (not shown), which may be used to couple the display 112 to other electrical circuits. For example, as shown in FIG. 7, one or more wires or other leads 154 may couple the display 112 to circuits 152 for operating the display 112. Optionally, the display 112 may include other components, such as one or more polarizer films, filters, image enhancement films, and/or viewing angle enhancement films on front and/or back surfaces of the display 112, e.g., overlying the active image area 120.

With continued reference to FIGS. 5-5E, the bezel 114 is a generally planar frame including a plurality of holes or other fastener elements 124 for mounting the flat panel display 110 to an outer surface of a control panel, e.g., control panel 90 or 190 shown in FIGS. 3 and 7. The bezel 114 may have a substantially rectangular periphery including a width and a height, e.g., a substantially square periphery as shown. Alternatively, the bezel 114 may have other shapes, e.g., an elliptical or round shape (not shown), if desired and/or based upon the available space on the control panel. The bezel 114 may include a relatively small depth or thickness, e.g., not more than about thirty millimeters (30 mm) or even less than about ten millimeters (10 mm), to minimize a profile that the flat panel display 110 above the outer surface of the control panel.

The bezel 114 generally includes a front panel 114a, best seen in FIG. 5, and a rear panel 114b, best seen in FIG. 5E, which may be assembled together to secure the display 112 therein. As shown in FIGS. 5A-5D, the frame 114 may include one or more side panels 116a-116d that extend between the front and rear panels 114a, 114b, thereby defining an interior space for receiving the display 112. In one embodiment, the side panels 116a-116d may be integrally formed with one of the front and rear panels 114a, 114b, e.g., such that the frame 114 is provided as two pieces. Alternatively, one or more of the side panels 116a-116d may be made as separate pieces that may be attached to the front and/or rear panels 114a, 114b, e.g., during assembly.

As shown in FIG. 5, the front panel 114a may include an opening 132 therein for allowing the active area 120 of the display 112 to be seen. Optionally, the front panel 114a may include one or more additional openings (not shown), e.g., for receiving a stem for a dial or other control (not shown) extending from the display 112. The rear panel 114b may include one or more openings therein, such as opening 133. The opening(s) may allow one or more wires (not shown, see, e.g., wires 154 shown in FIG. 7) to be received therethrough, may provide access to the display 112 within the bezel 114, e.g., for accessing one or more connectors or controls (not shown) on the back of the display 112, and the like.

The bezel 114 may be formed from one or more flat sheets of material, e.g., a relatively thin sheet of metal, such as aluminum or stainless steel, plastic, or a composite material. The flat sheet may be cut into the shape of the panel(s) with appropriate extensions, e.g., for the side panel(s), and then formed into the desired shape, e.g., by roll-forming, breaking, machining, and the like. The holes 124, openings 132, 132, and/or other openings (not shown) may be cut or otherwise removed from the material, as desired, while the sheet(s) is(are) flat or after forming the sheet(s) into the desired shape. Alternatively, all or a portion of the bezel 114 may be machined, cast, injection molded, and the like.

The bezel 114 may include one or more connectors for assembling and/or otherwise securing the bezel 114 together, e.g., after receiving the display 112 therein. For example, edges of the front and rear panels 114a, 114b may include mating tabs and recesses, screws and sockets, and the like, which may cooperate to secure the front and rear panels 114a, 114b together. In addition or alternatively, the front and rear panels 114a, 114b (and/or side panels 116a-d, if initially separate) may be attached to one another by welding, soldering, bonding with adhesives, and the like. Optionally, one or more hinges (not shown) may be provided for opening the bezel 114, e.g., allowing the front and rear panels 114a, 114b to be hinged away from one another to access the interior, for example, to insert or remove the display 112, similar to previous embodiments.

As shown in FIG. 5, each corner of the bezel 114 includes a hole 124 for receiving a fastener (not shown) therethrough, e.g., a screw (such as screw 158 shown in FIG. 7), rivet, bolt, pin, and the like. Alternatively, fasteners (not shown) may be welded, bonded, or otherwise substantially permanently attached to each corner of the bezel 114, e.g., such that the fasteners extend substantially perpendicularly from a rear panel 114b of the bezel 114. In a further alternative, other fastener elements (not shown) may be used for mounting the bezel 114 to a control panel.

The location of the holes 124 in the corners (or otherwise about a periphery) of the bezel 114 may correspond to an existing pattern of holes adjacent a panel opening in a control panel (not shown) to which the flat panel display 110 is to be mounted. Although four holes 124 are shown, it will be appreciated that fewer or additional holes or other fastener elements, e.g., two, three, or more, may be provided on the bezel 114, as desired and/or as dictated by an existing control panel.

With additional reference to FIG. 7, during use, the flat panel display 110 may be mounted to an outer surface 191 of a control panel 190, e.g., a panel in a cockpit of an aircraft or simulator (not shown), a dashboard of a vehicle (also not shown), and the like, similar to other embodiments herein. If the flat panel display 110 is to replace an existing display or instrument (not shown), the existing display may first be removed from the control panel, e.g., as described elsewhere herein. Alternatively, the flat panel display 110 may be mounted to a control panel 190 that does not include an opening for an existing display. For example, the control panel 190 may be new, and openings may be cut or otherwise formed through the control panel 190, as desired, before mounting displays or other instruments to the control panel 190. In this alternative, a panel opening large enough to receive a display therein may not be needed. Instead, one or more openings (one exemplary opening 192 shown in FIG. 7) may be created through the control panel 190 at a desired location, e.g., for receiving one or more wires 154 therethrough. Thus, the opening 192 may be substantially smaller than the flat panel display 110, e.g., only one or two inches in cross-section, such that the opening 192 may receive the wires 154 or other elements (not shown) therethrough.

The flat panel display 110 may be selected based upon the available size on the control panel 190, e.g., based upon the area occupied by an existing display or based upon a designed lay-out for the control panel 190. For example, the flat panel display 110 may be used to replace an existing five inch by five display, which may have an active image area much smaller than five inches by five inches, because of the size of the panel opening, e.g., as described elsewhere herein. In this example, the outer dimensions of the display 112 may have an overall width and height greater than five inches by five inches, but smaller than the bezel 114. The bezel 114 may be sized to receive the display 112 therein, e.g., having a width and height of about six inches by six inches.

The front and rear panels 114*a*, 114*b* may be separated (if not already), and the display 112 may be placed, e.g., in a recess defined by the rear panel 114*b* with the active area 120 oriented upwardly or otherwise away from the rear panel 114*b*. The front panel 114*a* may then be placed over the display 112 and secured to the rear panel 114*b*. Alternatively, the display 112 may be placed in the front panel 114*a*, e.g., with the active area 120 oriented towards the opening 132 in the front panel 114*a*, and then the rear panel 114*b* may be placed over the display 112 and secured to the front panel 114*a*. Optionally, one or more spacers or other components may be placed within the bezel 114, e.g., to stabilize and/or support the display 112 therein and/or provide other functionality.

For example, the flat panel display 110 may include one or more backlights within the bezel 114, e.g., between the display 112 and the rear panel 114*b* and/or along one or more side edges of the display 112. For example, a backlight may be provided along the upper and lower edges of the display 112. The backlight(s) may include one or more fluorescent or LED lights, such as the NL1027BC16-01 from NEC. Optionally, the rear panel 114*b* may include a recess (not shown) for receiving each backlight, and/or may include one or more openings (also not shown) for receiving one or more wires or other leads extending from the backlight(s). If so, the backlight(s) may be placed within the bezel 114 before or after the display 112. Any connectors, e.g., screws, requiring adjustment may be tightened or otherwise manipulated to secure the front and rear panels 114*a*, 114*b* together, and/or otherwise to secure the display 112 and/or backlight(s) within the bezel 114.

As shown in FIG. 7, with the flat panel display 110 assembled, the flat panel display 110 may be placed against the outer surface 191 of the control panel 190, e.g., with the rear panel 114*b* oriented towards the control panel 190, e.g., over any opening 192 in the control panel 190. The holes 124 in the bezel 114 may be aligned with respective holes 198 in the control panel 190 (or the holes 198 may drilled or otherwise created through the control panel 190), and fasteners 158 may be threaded or otherwise directed through the holes 124, 158 to secure the bezel 114, and consequently the display 112, to the control panel 190. The rear panel 114*b* may be substantially flat such that the flat panel display 110 does not extend into or through the control panel 190.

One or more wires 154 or other leads may be directed through the control panel 190, e.g., through opening 192 before or after securing the flat panel display 112 to the control panel 190. The box 150 or other package, e.g., carrying circuits 152, may be mounted behind the control panel 190, similar to other embodiments herein. For example, the box 150 may include flanges 156 that may be secured to the back of the control panel 190 opposite the flat panel display 110 using the same fasteners 158 that secure the flat panel display 110 to the control panel 190. Alternatively, separate fasteners (not shown) may be used, thereby allowing the flat panel display 110 and box 150 to be installed and/or removed independently of one another. Any wires 154, leads, or other connectors (not shown) between the circuits 152, box 150, display 112, and/or backlight(s) (also not shown) may be connected at a convenient time during the installation.

Because the circuits 152 and display 112 are separate components, if either needs to be subsequently replaced, the other components may continue to be used, thereby potentially reducing costs associated with repairing or replacing the flat panel display 110, e.g., compared to self-contained instruments, which have to be replaced in their entireties.

As shown in FIG. 7 (and as similarly shown in FIG. 3), the display 112 is substantially larger than the panel opening 192 such that the display 112 cannot be directed through the panel opening. For example, the display 112 may have a width and a height, at least one of which is larger than the corresponding width and height of the panel opening. In addition or alternatively, the display 112 may have an overall area larger than the open area of the panel opening. Alternatively, the display 112 may have a shape that prevents the display 112 from passing through the panel opening. Thus, compared to conventional instruments, which may be limited to a display size that may be directed through a panel opening, the flat panel display 110 may allow a larger display to be provided, which may maximize or otherwise enhance displaying information on the display 112.

Figure 6A:
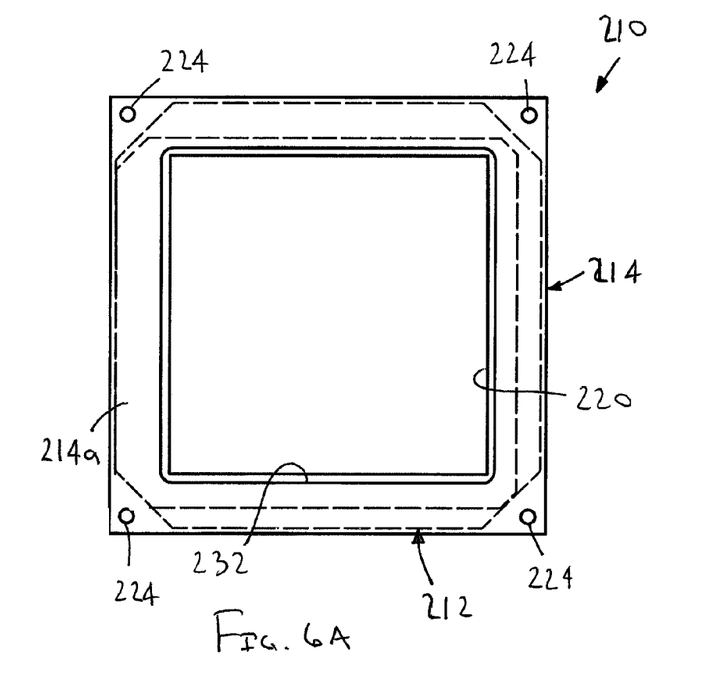
FIGS. 6A and 6B are front and rear views of still another embodiment of a flat panel display including a liquid crystal display with diagonal corners and a bezel or frame for mounting the display to a control panel.
Figure 6B:
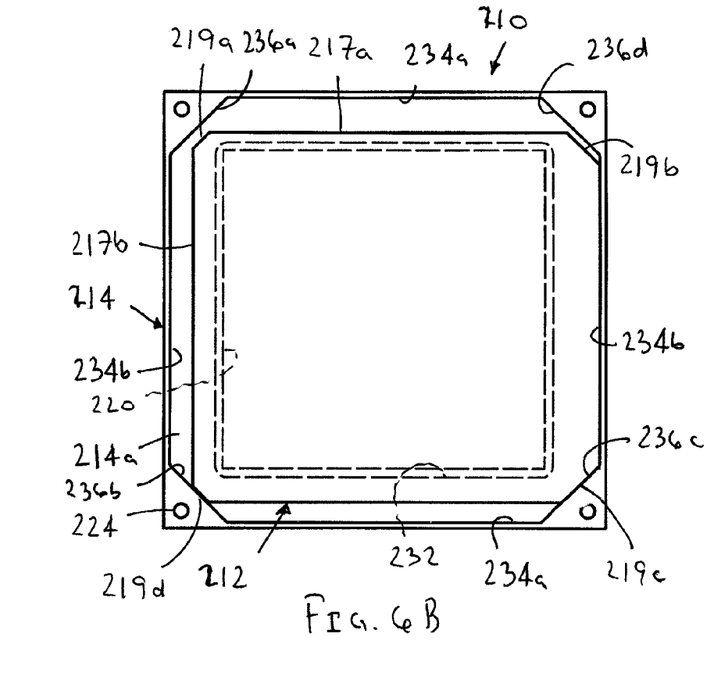

Turning to FIGS. 6A and 6B, still another embodiment of a flat panel display 210 is shown that generally includes a display 212 and a bezel or frame 214, which may be generally constructed and/or assembled similar to the other embodiments described herein. Similar to previous embodiments, the display 212 includes an active image area 220, and the bezel 214 includes a front panel 214*a* with an opening 232 therein that allows the active image area 220 to be seen. As best seen in FIG. 6B, the display 212 includes horizontal edges 217*a* (upper and lower edges), and vertical edges 217*b* (left and right edges) that are larger than the opening 232 in the bezel 214. In addition, the display 212 includes one or more diagonal corners 219, e.g., formed by cutting and resealing the corners 219 of a larger display, e.g., using the apparatus and methods disclosed in the applications incorporated by reference elsewhere herein.

The front panel 214*a* of the bezel 214 may be a substantially rectangular or square shaped frame, including holes 224 in corners thereof, e.g., for mounting the flat panel display 210 to a control panel including a panel opening 92 (shown in FIG. 8), similar to previous embodiments. As best seen in FIG. 6B, the front panel 214*a* may include a recess for receiving the display 212 therein, which may be at least partially defined by horizontal walls 234*a*, vertical walls 234*b*, and one or more diagonal walls 236. Because of the corners and holes 224, the recess may have an octagonal or other shape, e.g., including a substantially rectangular shape but with diagonal corners defined by diagonal walls 236. Thus, the front panel 214a may be similar to a pan, e.g., including a lower surface corresponding to the front of the bezel 214 with the opening 232 therein, an upper perimeter including the corners and holes 224, and the walls 234, 236 extending vertically or otherwise upwardly between the lower surface and the upper perimeter.

Optionally, the bezel 214 may include a rear panel (not shown), which may be placed over the recess of the front panel 214a, e.g., to enclose the display 212 within the bezel 214. The front and/or rear panels may include cooperating connectors (not shown), similar to other embodiments herein for permanently or selectively attaching the front and rear panels together. In one embodiment, the rear panel may overly the upper perimeter of the front panel 214a without overlying the corners on the front panel 214a. In another embodiment, the rear panel may extend over the corners of the front panel 214a, and may include holes therethrough that may be aligned with the holes 224 for receiving fasteners therethrough.

The diagonal corners 219 of the display 212 may be provided for facilitating receiving the display 212 within the recess of the front panel 214a and/or for maximizing the size of the display 212 that may be received in the bezel 214. For example, it may be desirable to maximize a width and height of the display 212, e.g., in order to maximize the active image area 220 of the display 212. However, because of the diagonal corners 236 of the recess, a substantially rectangular or square display would have to be small enough to fit within the recess without overlapping the diagonal walls 236. Because of the inactive area necessary around the display 212, the active image area of the display would be smaller than the available opening 232 in the front panel 214a.

By removing one or more (e.g., two, three, or all four) corners of the display 212, e.g., by cutting and resealing the corners, a larger display 212 may be provided within the bezel 214 than would otherwise fit. The inactive area may be closer to the diagonal walls 236, and may extend along the diagonal walls 236. Thus, the active image area 220 of the display 212 may be maximized. Alternatively, in some embodiments, it may only be necessary to remove one or two of the corners in order to allow a relatively large display 212 to be received within the bezel 214.

Figure 8:
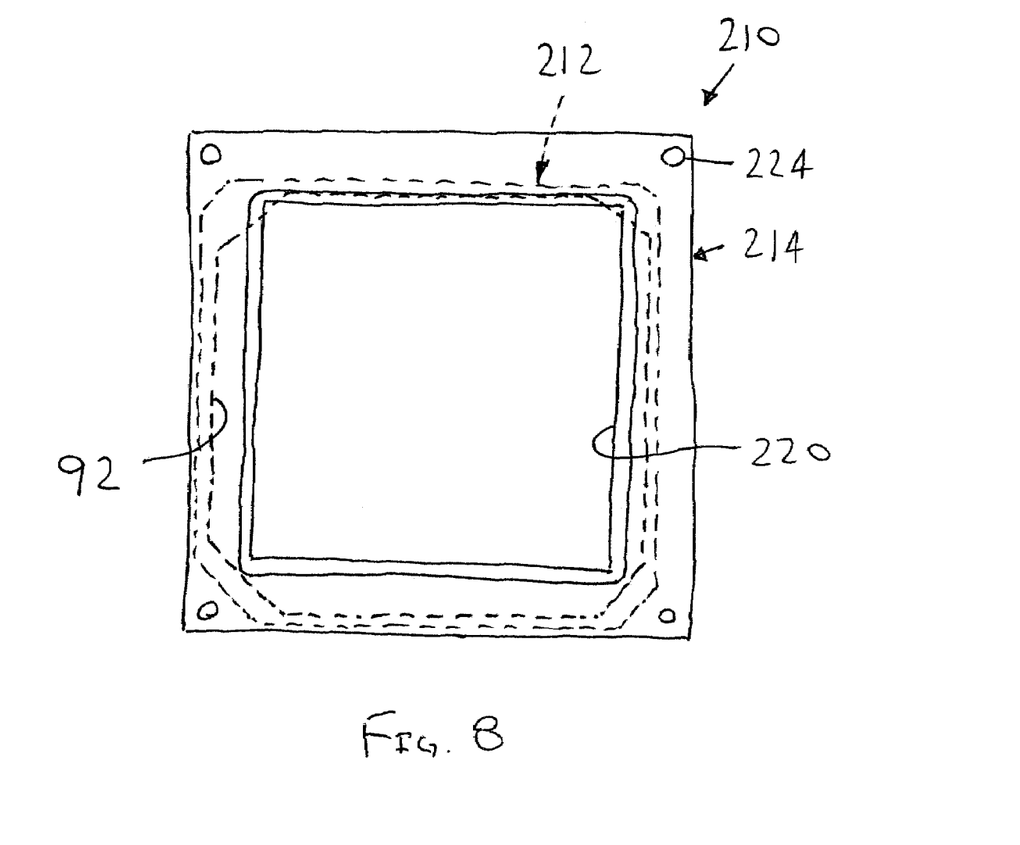
FIG. 8 is a front view of a flat panel display mounted over a panel opening in the control panel.

In addition, as shown in FIG. 8, the width and height of the display 212 may be larger than the width and height of a panel opening 92 over which the flat panel display 210 may be mounted, e.g., similar to other embodiments herein. As shown in FIG. 8, the panel opening 92 may include a generally rectangular shape with diagonal corners. Alternatively, the panel opening 92 may include square corners, i.e., a rectangular or square shape without diagonal corners.

In an exemplary embodiment, it may be desirable to replace an existing display or instrument, e.g., a three inch by three inch display. The panel opening for such an existing display may include fastener holes spaced apart by about three inches on center, e.g., similar to the holes 98 shown in FIG. 1. Consequently, the existing display may have an active area that is actually much smaller than three inches by three inches, e.g., sufficiently small to be received through the corresponding panel opening, e.g., similar to panel opening 92 in FIG. 1. Using the flat panel display 210 shown in FIGS. 6A and 6B, a display 212 may be provided that includes an active image area 220 having a width and height of at least about 2.377 inches.

For example, a COTS rectangular LCD, such as Model LTM04C380K manufactured by Toshiba may have a portion of the LCD removed and the exposed resealed to provide a display 212 having a substantially square active image area 220. In order to accommodate receiving the display 212 within a bezel 214 having an outer width and height of about 3.26 inches and holes 224 on three inch centers, corners of the display in the inactive area of the display 212 may also be removed and resealed, i.e., without cutting or otherwise damaging internal circuits necessary to operate the active image area 220.

Similar to previous embodiments, a separate box or package (not shown) may be provided that includes circuits for operating the resulting flat panel display 210. The box may be mounted behind the control panel generally opposite the flat panel display 210, e.g., similar to previous embodiments.

It will be appreciated that elements or components shown with any embodiment herein are exemplary for the specific embodiment and may be used on or in combination with other embodiments disclosed herein.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the scope of the appended claims.

I claim:

1. A method for mounting a new flat panel display to a control panel comprising a panel opening therein, the panel opening having an opening width and an opening height, comprising:

removing an existing display from the panel opening, the existing display having an active area smaller than the display being mounted over the panel opening;

mounting the new display to an outer surface of the control panel over the panel opening such that the display is abutting and secured substantially against the control panel, the new display having a display width and a display height, and wherein at least one of the opening width and the opening height is smaller than the display width and display height;

directing one or more wires from the new display through the control panel; and coupling the one or more wires to circuitry behind the control panel.

2. The method of claim 1, wherein the one or more wires are directed through the panel opening to the circuitry behind the control panel.

3. The method of claim 1, mounting the display to the outer surface of the control panel comprises:

mounting the display to a frame; and securing the frame to the control panel by directing fasteners through respective holes in the frame and holes in the control panel used to secure the existing display.

4. The method of claim 1, further comprising mounting a box behind the control panel, the box comprising the circuitry behind the control panel.

5. The method of claim 1, wherein the box is mounted behind the control panel generally opposite the display.

6. A method for mounting a flat panel display to a control panel, comprising:

resizing a rectangular display by cutting and resealing the rectangular display into a smaller configuration to provide the display;

mounting the display to an outer surface of the control panel such that the display is abutting and secured substantially against the control panel;
directing one or more wires from the display through the control panel; and
coupling the one or more wires to circuitry behind the control panel.

7. The method of claim 6, wherein resizing the rectangular display comprises removing at least one corner of the rectangular display by cuffing and resealing the at least one corner.

8. A method for mounting a flat panel display to a control panel having a panel opening therein, the panel opening having an opening width and an opening height, comprising:
removing an existing display extending through the panel opening from the control panel;
securing a new display to a frame, the new display having a display width and a display height; and
mounting the frame to an outer surface of the control panel such that the new display is disposed over the panel opening, at least one of the opening width and the opening height being smaller than the display width and the display height,
wherein the new display and the frame are substantially flat such that the new display lies substantially parallel to and abuts the control panel when the frame is mounted to the outer surface of the control panel.

9. The method of claim 8, wherein the existing display comprises at least one of a cathode ray tube, a galvanometric gauge, and a mechanical gauge.

10. The method of claim 8, the control panel comprising a plurality of holes adjacent the panel opening, the frame being mounted to the control panel by a plurality of fasteners received through the holes.

11. The method of claim 10, the frame comprising a plurality of holes that are aligned with the plurality of holes in the control panel, and where the plurality of fasteners are received through respective holes in the frame and control panel.

12. The method of claim 10, wherein the panel opening comprises a rectangular shape including diagonal corners and wherein the plurality of holes are disposed through respective diagonal corners.

13. The method of claim 8, further comprising:
directing one or more wires from the new display through the control panel; and
coupling the one or more wires to circuitry behind the control panel.

14. The method of claim 13, further comprising mounting a box behind the control panel, the box comprising the circuitry behind the control panel.

15. The method of claim 14, wherein The box is mounted behind the control panel generally opposite the new display.

16. A method for retrofitting an existing display mounted to a control panel, at least a portion of the existing display extending into a panel opening in the control panel, the existing display having an active area smaller than the panel opening, the method comprising:
removing the existing display from the control panel;
securing a new display to a frame, the new display having an active area larger than the panel opening;
mounting the frame to an outer surface of the control panel such that the new display is disposed over the panel opening, and wherein the display and the frame are substantially flat such that the display lies substantially parallel to and abuts the control panel when the frame is mounted to the outer surface of the control panel;
directing one or more wires from the new display through the control panel; and
coupling the one or more wires to circuitry behind the control panel.

17. The method of claim 3, wherein the display and the frame are substantially flat such that the display lies substantially parallel to the control panel when the frame is mounted to the outer surface of the control panel.

18. The method of claim 3, the control panel comprising a plurality of holes adjacent the panel opening, the frame being mounted to the control panel by a plurality of fasteners received through the holes.

19. The method of claim 3, wherein the panel opening comprises a rectangular shape including diagonal corners and wherein the plurality of holes are disposed through respective diagonal corners.

20. The method of claim 8, further comprising resizing a rectangular display by cutting and resealing the rectangular display into a smaller configuration to provide the new display.

21. The method of claim 20, wherein resizing the rectangular display comprises removing at least one corner of the rectangular display by cutting and resealing the at least one corner.

22. The method of claim 1, wherein the display is secured against the outer surface of the control panel by a plurality of fasteners.

* * * * *

UNITED STATES PATENT AND TRADEMARK OFFICE
CERTIFICATE OF CORRECTION

| | | |
|---|---|---|
| PATENT NO. | : 7,708,233 B2 | Page 1 of 1 |
| APPLICATION NO. | : 11/752273 | |
| DATED | : May 4, 2010 | |
| INVENTOR(S) | : Lawrence E. Tannas, Jr. | |

It is certified that error appears in the above-identified patent and that said Letters Patent is hereby corrected as shown below:

Column 17:
Line 9, please change "display by cuffing and resealing" to -- display by cutting and resealing --
Line 23, please change "are substantially fiat" to -- are substantially flat --

Column 18:
Line 4, please change "wherein The box is" to -- wherein the box is --

Signed and Sealed this
Thirteenth Day of September, 2011

David J. Kappos
*Director of the United States Patent and Trademark Office*